United States Patent
Piccionielli

(10) Patent No.: US 9,553,963 B2
(45) Date of Patent: Jan. 24, 2017

(54) WRIST PHONE

(71) Applicant: Gregory A. Piccionielli, Westlake Village, CA (US)

(72) Inventor: Gregory A. Piccionielli, Westlake Village, CA (US)

(*) Notice: Subject to any disclaimer, the term of this patent is extended or adjusted under 35 U.S.C. 154(b) by 0 days.

(21) Appl. No.: 13/815,763

(22) Filed: Mar. 15, 2013

(65) Prior Publication Data

US 2014/0274213 A1 Sep. 18, 2014

(51) Int. Cl.
*H04M 1/02* (2006.01)

(52) U.S. Cl.
CPC ......... *H04M 1/0268* (2013.01); *H04M 1/0206* (2013.01); *H04M 1/0295* (2013.01)

(58) Field of Classification Search
CPC .... H04M 1/02; H04M 1/0206; H04M 1/0214; H04M 1/0268; H04M 1/0295
USPC ................... 455/550.1, 556.1, 566
See application file for complete search history.

(56) References Cited

U.S. PATENT DOCUMENTS

| 7,020,270 | B1* | 3/2006 | Ghassabian | 379/368 |
| 8,082,003 | B2* | 12/2011 | Jee | 455/556.1 |
| 8,421,683 | B2* | 4/2013 | Mak et al. | 343/702 |
| 2010/0029327 | A1* | 2/2010 | Jee | 455/556.1 |
| 2010/0317409 | A1* | 12/2010 | Jiang et al. | 455/566 |
| 2010/0328171 | A1* | 12/2010 | Mak | H01Q 1/273 343/720 |
| 2013/0262298 | A1* | 10/2013 | Morley | H04M 1/05 705/39 |
| 2014/0049487 | A1* | 2/2014 | Konertz et al. | 345/173 |
| 2014/0099479 | A1* | 4/2014 | Krall | B32B 3/14 428/174 |

* cited by examiner

*Primary Examiner* — Asghar Bilgrami
(74) *Attorney, Agent, or Firm* — Gregory B. Gulliver; Apogee Law Group P.C.

(57) ABSTRACT

A telecommunication device includes a casing, smart phone components disposed within the casing, two opposed flexible wrist grips having upper and lower surfaces, and a flexible screen disposed on the lower surfaces of the casing and the opposed flexible wrist grips and in communication with the smart phone components.

8 Claims, 10 Drawing Sheets

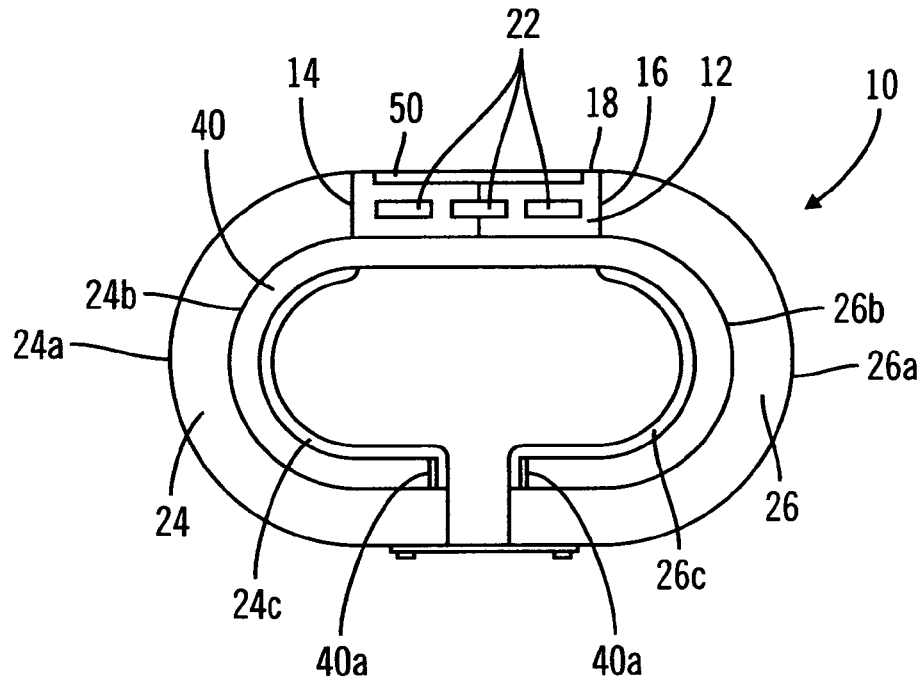
FIG. 1
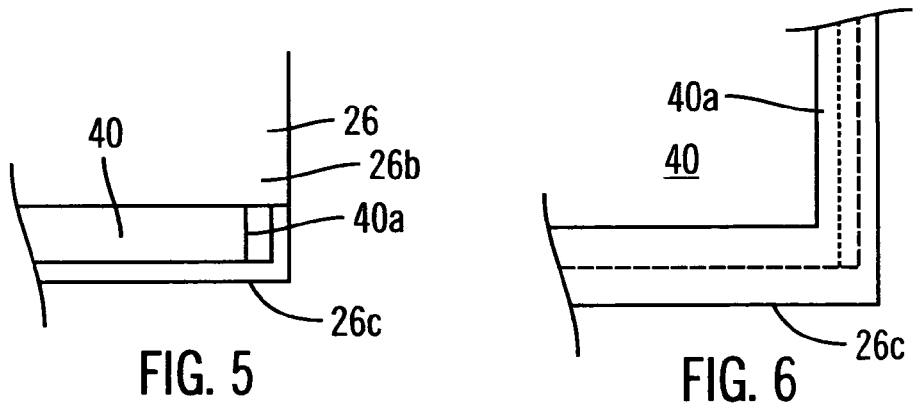
FIG. 5
FIG. 6

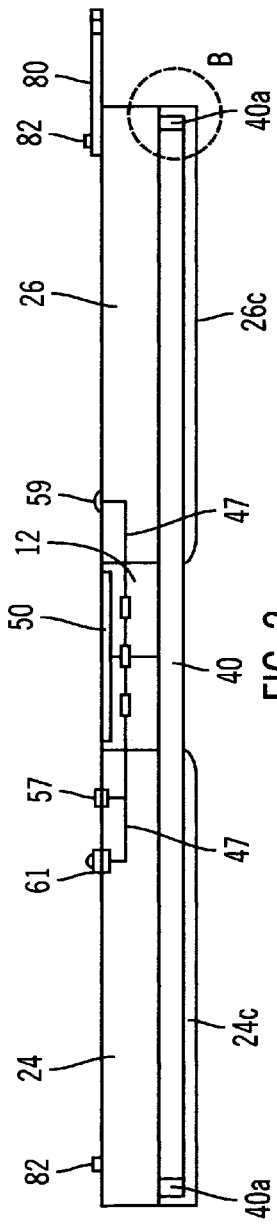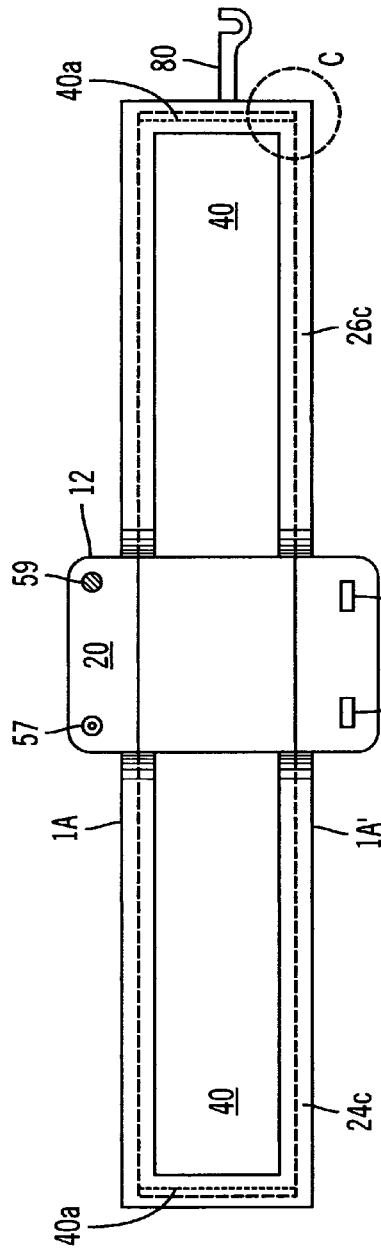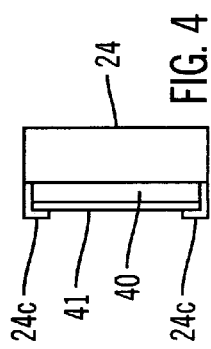

WRIST PHONE

FIELD OF THE INVENTION

The present invention relates to telecommunication devices, such as smart phones. In particular, the present invention relates to wearable telecommunication devices.

BACKGROUND OF THE INVENTION

Wearable devices, including computers, smart phones and the like, have become of interest to the consumer seeking more convenience and portability.

A need exists for an improved smart phone that is wearable by a user.

Additionally, personal telecommunication devices, such as smart phones and the like, have become of interest to the consumer seeking improved audiovisual communication capability, as well as ready access to networks such as the Internet. Present smart phones, however, often include screens that are relatively small. Small screen size results in small image presentation to the user of the smart phone. Increasing screen size, however, results in increased overall size of the telecommunication device, which can lead to difficulty carrying, transporting and/or storing the device.

A need exists for an improved telecommunication device that includes a larger screen than known smart phones, without adversely corresponding overall increase in the size of the telecommunication device.

SUMMARY OF THE PREFERRED EMBODIMENTS

In accordance with one aspect of the present invention, there is provided a telecommunication device that includes: a casing having upper and lower surfaces; smart phone components disposed within the casing; two opposed flexible wrist grips having upper and lower surfaces; and a flexible screen disposed on the lower surfaces of the casing and the opposed flexible wrist grips and in communication with the smart phone components.

In particular embodiments, the two opposed flexible wrist grips comprise grooved guides, and the flexible screen slidingly engages the grooved guides.

In various embodiments, the two opposed flexible wrist grips are integral with the casing. In other alternative embodiments, the casing has at least one pair of opposed sides, and the two opposed flexible wrist grips are secured to opposed sides of the casing. In still other alternative embodiments, the two opposed flexible wrist grips include a plurality of segments. Such segments can be, in various embodiments, mechanically linked elements; in additional embodiments, segments can be defined by suitable molding of the flexible wrist grips, or by scoring the flexible wrist grips. In still other embodiments, at least one of the wrist grips has defined therein at least one space adapted to receive at least one smart phone component.

In further embodiments, a protective layer is applied to at least a portion of the flexible screen.

According to additional embodiments, the inventive telecommunication device includes a second screen in communication with the smart phone components. In such embodiments, the casing has an upper surface and the second screen is disposed on or in the upper surface of the casing. In various specific embodiments, the second screen is a flexible screen; thus, a sandwich-like structure is produced in which flexible screens are disposed on both the upper and the lower surfaces of the casing and in contact with upper and lower surfaces of the flexible wrist grips. In other embodiments, a rigid screen is disposed on or in the upper surface of the casing, in a manner similar to the disposition of screens in known smartphones and other telecommunication devices.

In some embodiments one or more of the screens are touch screens.

In additional embodiments, the two opposed flexible wrist grips have distal ends, and a clasp hook and eye, buckle, or other connecting mechanism secures the two distal ends. In additional embodiments, the flexible wrist grips are provided with end caps. In some embodiments, the end caps are generally cylindrical in shape and contain a hollow space. In particular embodiments, at least some smart phone components are disposed within one or more of the hollow spaces disposed within one or more of the end caps. Such embodiments facilitate uncurling of the wrist grips, and also provide additional space for accommodating smart phone components. In additional particular embodiments, the end caps are provided with magnetic components that enable opposed end caps to be secured together when the wrist phone is worn by a user. In further particular embodiments, one or more end caps can be provided with one or more cameras, microphones and/or projectors.

In some embodiments, one or more mechanical switches or controls, such as an on/off switch, volume control, ringer control, etc. can be provided to one or more end caps. In accordance with one aspect of the present invention, there is provided a telecommunication device that includes a retractor; a flexible screen; an end unit; and smart phone components. The retractor includes an axle, at least one conductor in communication with the axle, a casing having a top, a bottom and a lateral surface, the lateral surface having defined therein a slot, the slot extending substantially in parallel to the axle, top and bottom caps secured to the casing, and a reversible retraction mechanism. The flexible screen includes proximal and distal ends. The flexible screen is coilable about the axle, the proximal end being secured to the axle, the distal end extending through the slot in the casing. The flexible screen communicates with at least one conductor of the retractor. The end unit is secured to the second end of the flexible screen, and is configured to prevent retraction of the second end of the flexible screen into the casing. The smart phone components are disposed within or secured to the retractor casing, and are in communication with the flexible screen through at least one conductor of the retractor.

In more particular embodiments, the smart phone components are disposed in or secured to at least one of the top and bottom caps of the casing. In very particular embodiments, the smart phone components are disposed within at least one of the top and bottom caps of the casing.

In accordance with another aspect of the present invention, there is provided a telecommunication device that includes a flexible screen disposed between two retractors as described herein.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 is a side sectional view of an embodiment of a telecommunication device according to the invention, in which the wrist grips are in a curled position suitable for engaging the wrist of a wearer, FIGS. 2-3 are side sectional and bottom partially shadow plan views of the embodiment of FIG. 1 in which the wrist grips are uncurled and the flexible screen is extended for viewing, FIG. 4 is a sectional view along line A-A' of a wrist grip of the foregoing embodiment, illustrating the engagement of a portion of the flexible screen with grooved guides of the wrist grip, FIG. 5 is an enlargement of portion "B" of the sectional view of FIG. 2, showing the relative positions of a distal end of the flexible screen, a grooved guide, and an underside of a wrist grip, FIG. 6 is an enlargement of portion "C" of the bottom plan view of FIG. 3, showing the relative positions of a distal end of the flexible screen and a grooved guide.

FIGS. 15-16 include includes illustrations of additional embodiments of wrist phones.

In the figures, like numbers are used to denote like elements throughout. Vertical and horizontal scales have been exaggerated for ease of illustration.

DETAILED DESCRIPTION OF THE PREFERRED EMBODIMENTS

Figure 7:
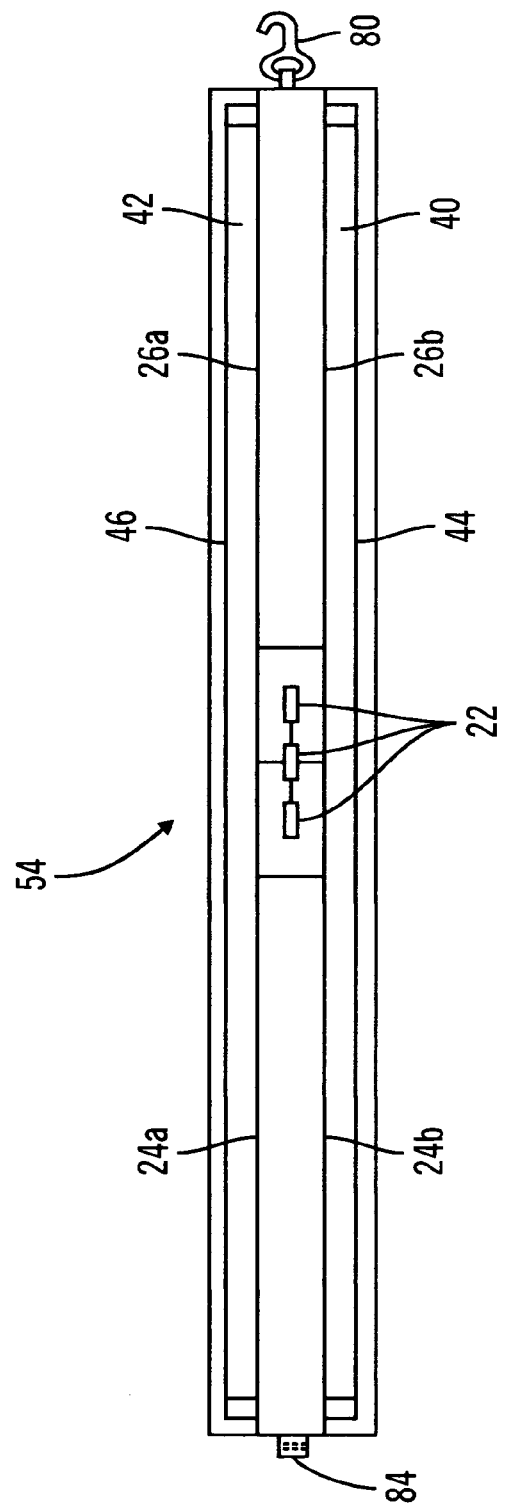
FIG. 7 is a side sectional view of an embodiment of a telecommunication device according to the invention in which first and second flexible screens are disposed respectively on upper and lower surfaces of the casing, in manners similar to the disposition of the flexible screen in the embodiment of FIG. 1, FIGS. 8a-b are perspective and sectional views along line D-D', respectively, of an additional embodiment in which the flexible wrist grips are formed from a plurality of linked segments.

Turning now to the figures, in FIGS. 1-6 telecommunication device 10 includes casing 12, opposed flexible wrist grips 24, 26, and flexible screen 40. Flexible screen 40, in particular embodiments, comprises an OLED screen, such as that produced by Samsung. Other flexible screens can also be employed. Casing 12 has opposed sides 14, 16 (which can be, in various embodiments, substantially straight or curved, and in various additional embodiments, parallel or non-parallel), upper surface 18, and lower surface 20, lower surface 20 facing a user's wrist. Casing 12 encloses smart phone components 22, which comprise at least a portion of the components commonly found in smart phones, such circuitry, power supplies (e.g., batteries), components used to activate and send signals to one or more display screens, such as flexible screen 40, components used to receive signals from one or more such screens which are touch screens, components providing the functionality of enabling the device to transmit and receive telephone calls, components enabling the device receive and record audio and visual information, such as sound recordings, photographs and audiovisual content, and other components commonly found in smart phone devices such as Apple iPhone®s, Samsung Galaxy® phones and the like.

Flexible wrist grips 24, 26 have upper surfaces 24a, 26a and lower surfaces 24b, 26b which face a user's wrist. In particular embodiments such as that illustrated in FIGS. 1-6, wrist grips 24, 26 are provided with grooved guides 24c, 26c along sides 24d, 26d of wrist grips 24, 26. Grooved guides 24c, 26c, in particular embodiments, slidingly engage flexible screen 40 and constrain its motion, while ensuring that the portions of flexible screen 40 that are not secured to casing 12 are not stretched or distorted as wrist grips 24, 26 are uncurled. In alternative embodiments, flexible screen 40 is sufficiently stretchable to conform to uncurled wrist grips 24, 26 without damage or distortion. Some embodiments do not include grooved guides 24c, 26c.

Flexible wrist grips 24, 26, in particular embodiments, are formed integrally with casing 12, e.g, by molding a flexible material such as a polymer. In other particular embodiments, flexible wrist grips 24, 26 are formed as separate elements, and are secured to casing 12. For example, in specific embodiments, flexible wrist grip 24 is secured to side 14 of casing 12, while flexible wrist grip 26 is secured to side 16 of casing 12. Flexible wrist grips 24, 26 can be secured, in various embodiments, by mechanical connectors, adhesives, or any other desired connecting devices or processes such as heat-sealing. Such securing can be permanent or releasable.

In particular embodiments, at least a portion of flexible screen 40 is secured to at least a portion of lower surface 20 of casing 12, e.g., mechanically, adhesively, or by other desired securing devices or processes, while the remaining portions on either side of the secured portion are left to move freely with respect to lower surfaces 24b, 26b of flexible wrist grips 24, 26, as constrained by grooved guides 24c, 26c. In more particular embodiments, lower surfaces 24b, 26b are sufficiently smooth that motion of flexible screen 40 with respect to lower surfaces 24b, 26b does not result in substantial wear or damage to flexible screen 40, in particular wear or damage capable of degrading or destroying the function of flexible screen 40. In other more particular embodiments, flexible screen layer is provided with a protective coating to prevent such substantial wear or damage.

In use, when a user receives an incoming transmission to telecommunication device 10, which is disposed about his or her wrist by curling opposed flexible wrist grips 24, 26 thereabout, and wishes to view a video component of the transmission by means of flexible screen 40, the user uncurls opposed flexible wrist grips 24, 26 to substantially flatten flexible screen 40. In particular embodiments, distal ends 40a of flexible screen 40, which are not secured to lower surface 20 of casing 12 or lower surfaces 24b, 26c of flexible wrist grips 24, 26, slide with respect to lower surfaces 24b, 26b as flexible screen 40 is flattened. FIGS. 2, 3, 5 and 6 illustrate a final position of a portion of flexible screen 40, including distal end 40a, with respect to lower surface 26b and grooved guide 26c of flexible wrist grip 26. Once flexible screen 40 is flattened to a desired extent by the user, the user is enabled to view on flexible screen 40 a video component of the transmission received by telecommunication device 10.

Various embodiments of wrist phones according to the invention include one screen, i.e., flexible screen 40. Additional particular embodiments provide a wrist phone having multiple screens. For example, an optional second, rigid screen 50 similar to the screen incorporated into known smart phones is provided on or in upper surface 18 of casing 12 and in communication with smart phone components 22 of wrist phone 54 in the embodiment illustrated in FIG. 1. In FIG. 7, second flexible screen 42 is provided; thus, a "sandwich" structure is produced in which casing 12 and wrist grips 24, 26 are disposed between flexible screens 40, 42.

In some embodiments one or more cameras are configured within the casing 12 on one or more sides of the casing 12, and such cameras 57 are connected to, or are otherwise in communication with, internal components in the casing 12, end caps 45, and/or wrist grips 24, 26. In some embodiments one or more microphones are configured within the casing 12 on one or more sides of the casing 12, and such microphones 59 are connected to, or are otherwise in communication with, internal components in the casing 12, end caps 45, and/or wrist grips 24, 26. In some embodiments, one or more mechanical switches or controls 53, such as an on/off switch, volume control, ringer control, etc., are connected to, or are otherwise in communication with, internal components in the casing 12, end caps 45, and/or wrist grips 24, 26 are included in the casing 12 and/or wrist grips 24, 26.

In some embodiments (see FIG. 12) one or more microphones 59 are configured within the casing 12 on one or more sides of the casing 12, and such microphones 59 are connected to, or are otherwise in communication with, internal components in the casing 12, end caps 45, and/or wrist grips 24, 26.

In some embodiments one or more cameras 57, microphones 59 and/or projectors 61 are configured within one or more of the wrist grips 24, 26 on one or more sides of one or more wrist grips 24, 26, and such camera(s), microphone(s) and/or projector(s) is/are connected to, or are otherwise in communication with, internal components in the casing 12, end caps 45, and/or wrist grips 24, 26. In some embodiments the one or more cameras, microphones and/or projectors are configured within one or more of the wrist grips 24, 26 on one or more sides of one or more wrist grips 24, 26, and such camera(s), microphone(s) and/or projector(s) is/are connected to, or are otherwise in communication with, internal components in the casing 12, end caps 45, and/or wrist grips 24, 26 via flexible leads 47.

In some embodiments, one or more mechanical switches or controls 53, such as an on/off switch, volume control, ringer control, etc., are connected to, or are otherwise in communication with, internal components in the casing 12, end caps 45, and/or wrist grips 24, 26 are included in the casing 12 and/or wrist grips 24, 26. In some embodiments, the one or more mechanical switches or controls, such as an on/off switch, volume control, ringer control, etc., are connected to, or are otherwise in communication with, internal components in the casing 12, end caps 45, and/or wrist grips 24, 26 via flexible leads 47. In additional embodiments (see FIG. 12), the flexible wrist grips 24, 26, are provided with end caps 45. In some embodiments the end caps are generally cylindrical and include one or more hollow spaces disposed therein. In particular embodiments, at least some smart phone components 22 are disposed within one or more hollow spaces 45a defined within one or both of the end caps 45 and communicate with further smart phone components 22 within casing 12 via flexible leads 47 contained in wrist grips 24, 26. Such embodiments facilitate uncurling of the wrist grips 24, 26, and also provide additional space for accommodating smart phone components. In additional particular embodiments, the end caps 45 are provided with magnetic components 49 that enable opposed end caps to be secured together when the wrist phone is worn by a user. In further particular embodiments, one or more end caps 45 can be provided with one or more cameras 57, microphones 59 and/or projectors 61. In some embodiments, one or more mechanical switches or controls 53, such as an on/off switch, volume control, ringer control, etc. can be provided to one or more end caps 45.

Figure 12:
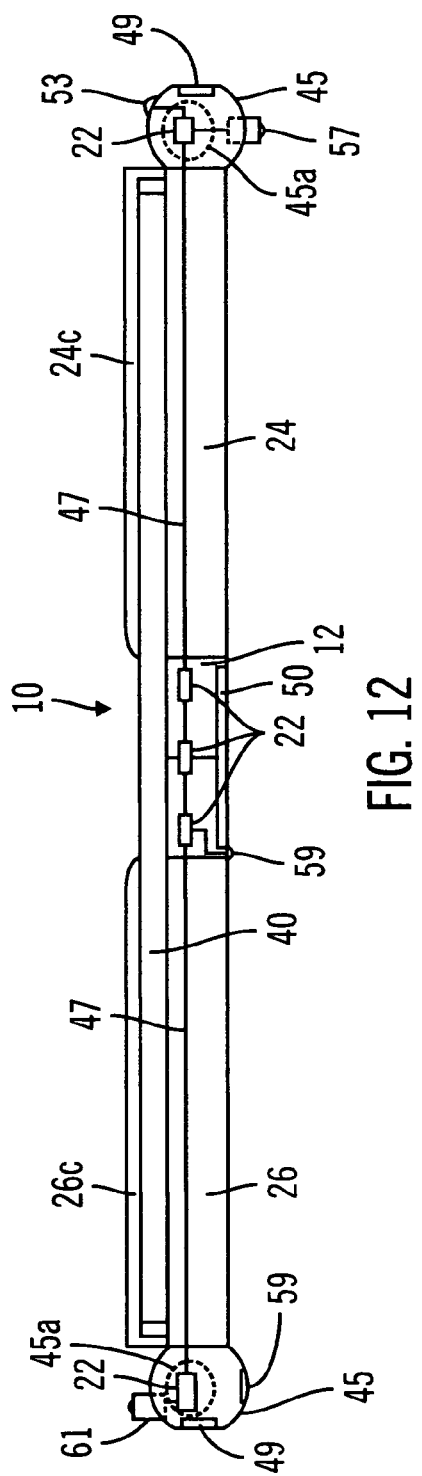

Alternative embodiments modifying the embodiment of FIG. 12 omit casing 12 entirely. In such embodiments, wrist grips 24, 26 form a continuous structure, or are secured together to form a single curlable structure. These scroll-like embodiments include end caps 45 in which smart phone components 22 are disposed. Additional elements and control mechanisms are also disposed in end caps 45 as described with respect to the previous embodiment. In use, such scroll-like telecommunication devices can be rolled up from either end into a compact, wound-scroll shape.

More specific embodiments of the scroll-like telecommunication device provide flexible screens on both sides of the wrist grips 24, 26 or the curlable structure they jointly form; as described herein with reference to embodiments including two flexible screens.

Grooved guides 44, 46 (which, as illustrated, are in further particular embodiments continuous flexible structures that extend substantially the entire length of wrist phone 54) constrain the sliding movements of flexible screens 40, 42 with respect to upper surfaces 24a, 26a and lower surfaces 24b, 26b of wrist grips 24, 26. Flexible wrist grips 24, 26 can be constructed of any desired flexible materials, with or without additional reinforcing structures. Various polymeric, metallic, and other materials will be beneficially employed in particular embodiments based on anticipated wear, exposure to harsh environmental conditions, and other factors readily determined by skilled artisans. Non-limiting examples of flexible wrist grips useful according to the invention are formed from a polymer matrix within which are embedded internal flexible supports comprised of a metallic or polymeric material.

Figure 8:
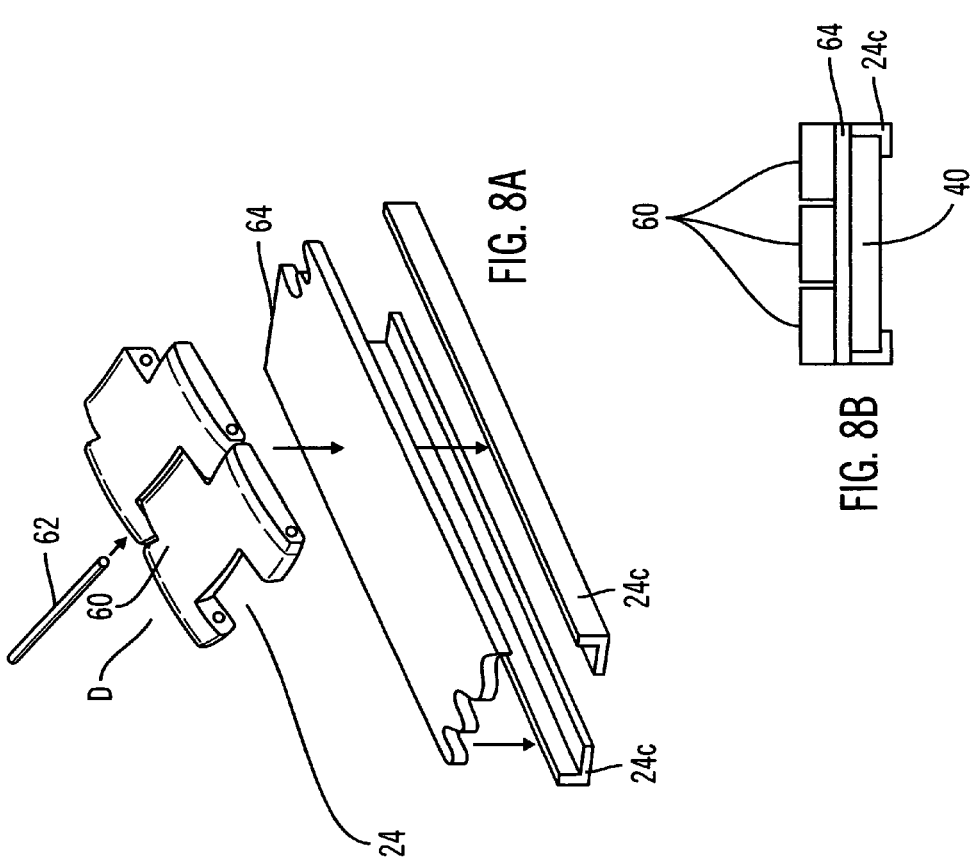

In alternative embodiments, flexible wrist grips 24, 26 comprise a plurality of separate segments 60 that are linked together. Segmented wrist grips, in various embodiments, can be produced for use with wrist phones of the invention by adapting well-known methods for producing segmented watch bands and the like, such as the methods disclosed in U.S. Pat. No. 6,418,706, Kit, and various of the references cited therein. Thus, in FIG. 8, segments 60, held together by pins 62, form at least a portion of flexible wrist grip 24. In more particular embodiments, liner 64 is disposed between segments 60 of flexible wrist grip 24 and grooved guides 24c, in order to provide a smoother surface along which flexible screen 40 is enabled to slide.

Figure 9:
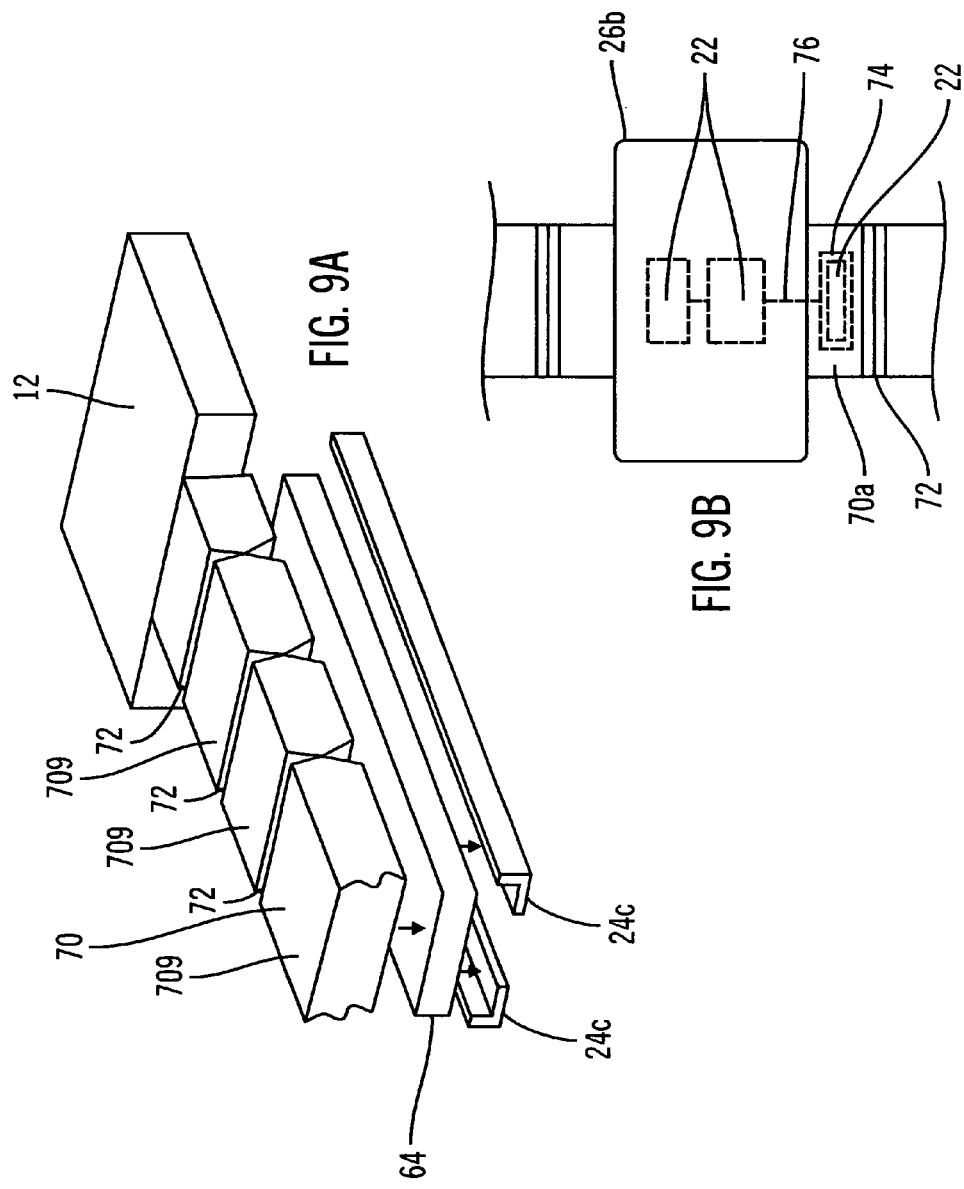
FIGS. 9a-b are perspective and top plan partial shadow views of an additional embodiment in which the flexible wrist grips include a plurality of scored segments, and in which at least one of the scored segments has defined therein a space for receiving one or more smart phone components.
Figure 10:
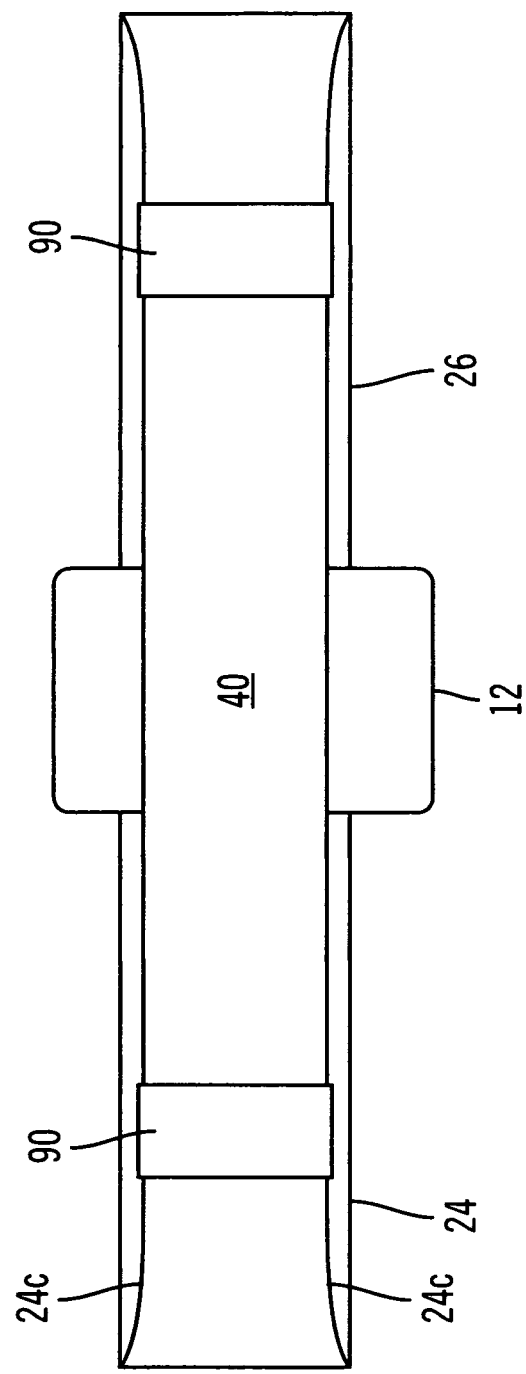
FIG. 10 is a bottom plan view of an alternative embodiment employing retractors to extend and retract the flexible screen.

Another variant of a segmented wrist grip useful in embodiments of the invention is formed by molding, scoring or otherwise shaping a flexible material into a structure having a plurality of defined segments (exemplified in FIG. 9a). Scored wrist grip 70 has defined in its upper and lower surfaces a plurality of notches 72, which define segments 70a. Liner 64 is again useful in particular embodiments to provide a smooth sliding surface for movement by flexible screen 40.

A particular variant embodiment of the structure in FIG. 9a provides a space 74 within at least one segment 70a, within which at least one smart phone component 22 is disposed. Space 74 is provided, in particular embodiments, with a removable cover to enable access to the smart phone component disposed therein. Component 22 disposed within space 74 communicates via lead 76 with further smart phone components 22 disposed within case 12.

When opposed flexible wrist guards 24, 26 of telecommunication device 10 are curled and telecommunication device 10 is worn on a user's wrist, contact between flexible screen 40 and the user's skin may result in damage to or degradation of flexible screen 40. Additionally, environmental contaminants such as dirt, dust, liquids, etc., may come into contact with flexible screen 40 or become entrapped between flexible screen 40 and the user's skin, causing damage to flexible screen 40. In order to reduce or prevent degradation of or damage to flexible screen 40, particular embodiments provide protective layer 41, which is applied to at least a portion of flexible screen 41. (See FIG. 4.) Protective layer 41 can comprise any desired protective material, and can be, in various embodiments, transparent or translucent, and can be colorless or colored.

To further secure telecommunication device 10 to a user's wrist, various embodiments provide a clasp, buckle, hook and eye or post (e.g., hook 80 and posts 82 in FIG. 2; hook 80 and eye 84 in FIG. 7), or other connecting device that secures distal ends 24e, 26e of flexible wrist grips 24, 26 in place about a user's wrist.

The foregoing embodiments have includes flexible screens 40 which are disposed in a fully extended state adjacent case 12 and flexible wrist grips 24, 26. Additional particular embodiments include wrist grips 24, 26 and retractors 90 that engage wrist grips 24, 26. Retractors 90 in turn are secured to distal ends 40a of flexible screen 40 (coiled within retractors 90). In use, flexible wrist grips 24, 26 are uncurled, and retractors 90 are pulled away from casing 12 along lower surfaces 24b, 26b of flexible wrist grips 24, 26, guided by grooved guides 24c, 26c or other suitable constraining mechanisms. Thus, flexible screen 40 is unwound on either side of case 12 to provide an extended screen. Suitable retractors 90 can be produced by simple modifications of known retracting devices, such as retractors used with automobile safety belts, and include appropriate mechanisms for locking in position once a desired flexible screen deployment has been achieved.

Figure 11:
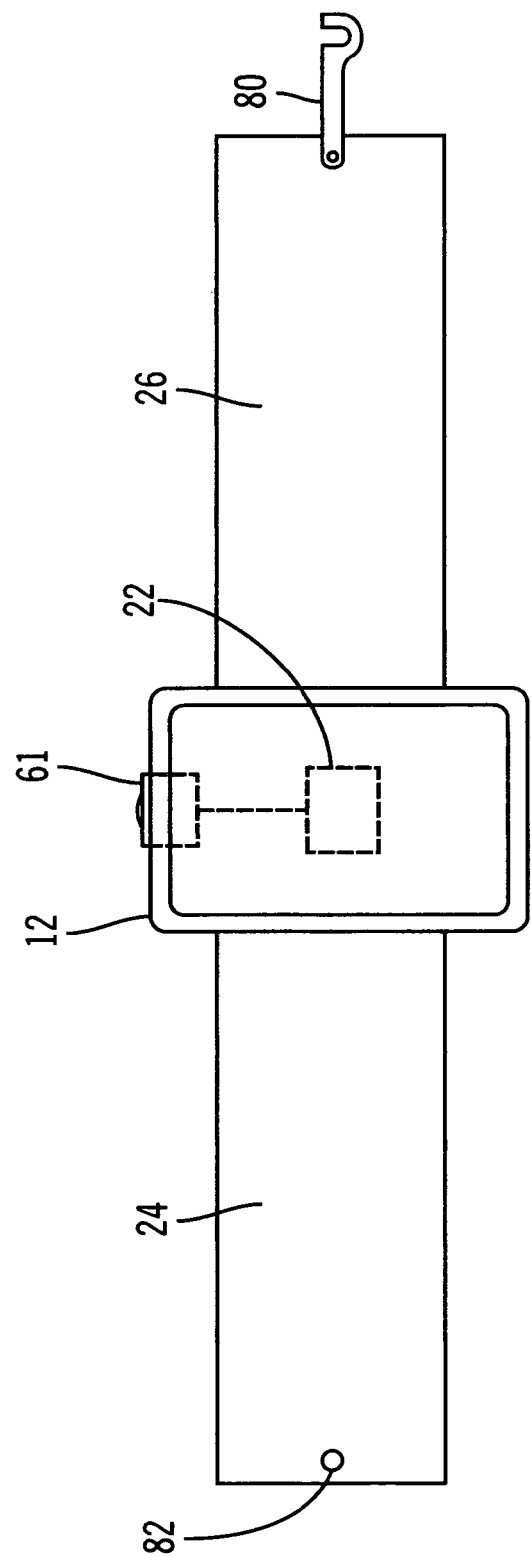
FIG. 11 is a top plan partial shadow view of an additional embodiment including a projector, and FIG. 12 includes additional illustrations of an additional embodiment including end caps.

Additional features can be incorporated into embodiments of the inventive wrist phone in order to provide additional desirable utility. Thus, in FIG. 11, projector 61 in communication with smart phone components 22 enables the wearer to project images provided to his or her wrist phone. Suitable projectors for incorporation into particular embodiments of the inventive wrist phone are known to skilled artisans, and include, as non-limiting examples, projectors depicted at http://www.microvision.com/pico_projector_displayshowitworks.html. Such devices are capable of projecting images onto a large variety of surfaces and shapes, and are sometimes referred to as a Pico Projector Display Engine, at a least one type of which is produced by Microvision, Inc., of Washington.

Figure 13A:
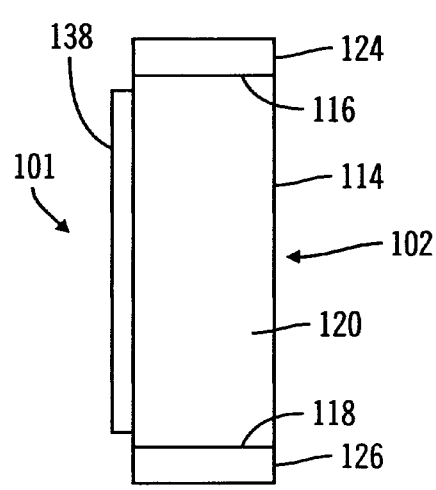
FIGS. 13a-c are side retracted, side extended and top cross-sectional retracted views of a first embodiment of a "roll phone" according to a first aspect of the invention.
Figure 13C:
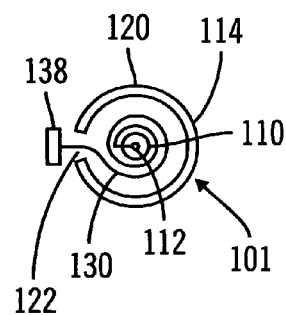
Figure 13B:
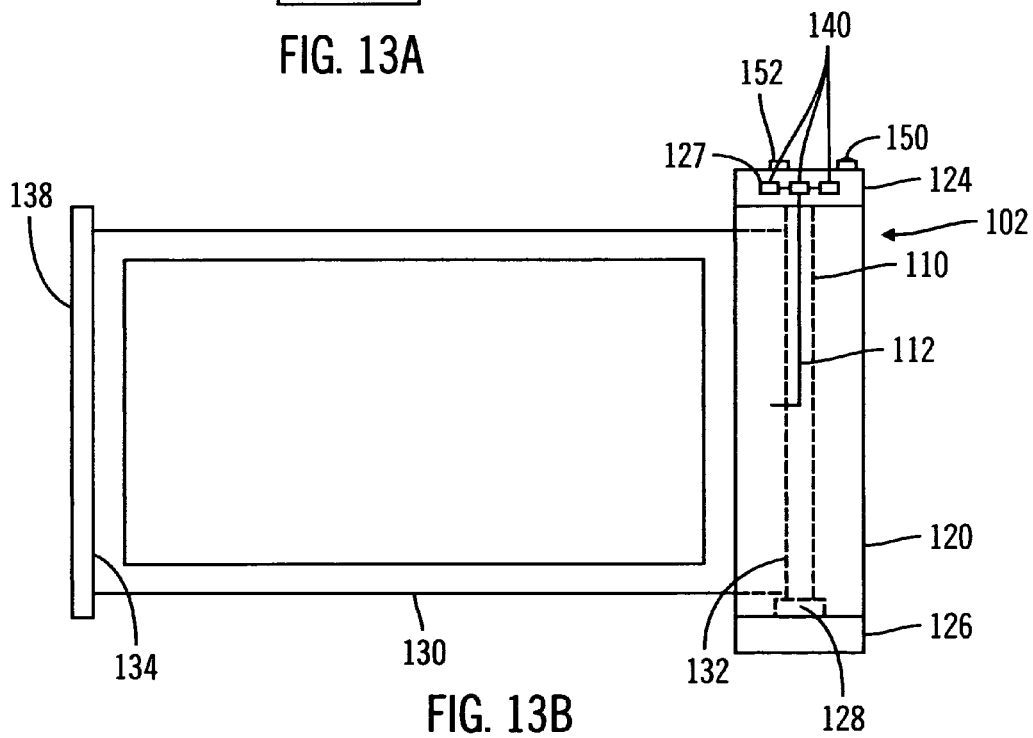

FIGS. 13a-c and 14a-b illustrate additional embodiments of smart phones employing flexible screens according to the invention. FIGS. 13a-c illustrate a "roll phone" embodiment. Telecommunication device 101 includes reversible retractor 102. Reversible retractors are well-known to skilled artisans. Non-limiting examples of reversible retractors include seat belt retractors, tape measures, and obvious modifications thereof. The illustrated exemplary retractor comprises axle 110, casing 114 and reversible retraction mechanism 128. Axle 110 rotates (in forward and reverse directions to enable extension and retraction) within casing 114, and is rotatably mounted within casing 114 using any desired means, including bearings, gears, springs, and/or other known mounting devices conventionally used in producing reversible retractors, as well as releasable locking mechanisms for stopping further undesired extension and/or retraction. Casing 114 has a long axis which is substantially parallel to axle 110 in particular embodiments.

Secured to axle 110 is proximal end 132 of flexible screen 130, which communicates with conductor 112 included in axle 110. Conductor 112 can be, in various embodiments, a conductive wire or lead, a conductive metallic device, or any other element that is adapted to enable communication between flexible screen 130 and smart phone components 40 such that video information received by smart phone components 140 can be displayed on flexible screen 130.

Flexible screen 130, as with previous particular embodiments, comprises an OLED screen, such as that produced by Samsung. Other flexible screens can also be employed. Flexible screen 130 is coilable around axle 110 within casing 114 of reversible retractor 102 (FIG. 13c).

Lateral surface 20 of casing 14 has defined therein slot 122 through with distal end 134 of flexible screen 130 extends. Slot 122 is preferably substantially parallel to axle 110 to enable flexible screen 130 easily to be extended and retracted. End unit 138 is secured to distal end 134 of flexible screen 130, and prevents distal end 134 from being retracted within casing 114. End unit 138 also facilitates a user extending flexible screen 130 from retractor 102 by grasping end unit 138. End unit 138 can have a variety of shapes and configurations, so long as the unit prevents retraction of distal end 134 within casing 114. Casing 114 has top 116 and bottom 118. Top cap 124 and bottom cap 126 are secured to top 116 and bottom 118, respectively. In alternative embodiments, only one cap is employed, and the top or bottom to which a cap is not secures constituted a top or bottom surface of casing 114. Smart phone components 140 are disposed in or secured to retractor 102, and in particular embodiments which include a space or spaces 127 defined within one or both caps 124, 126, within such cap or caps.

Smart phone components 140, as discussed previously, comprise at least a portion of the circuitry, power supplies (e.g., batteries) and other components such as microphones and cameras, used to activate flexible screen 130, with which they are in communication via conductor 112, and transmit and receive audio, and optionally video, information. In particular embodiments, additional components including, without limitation, camera 150 and/or projector 152, are provided and communication with various of the smart phone components.

Casing 114 can have a variety of shapes, including cylinders (e.g., as illustrated), spheres, ellipsoids, rectangular prisms, irregular shapes such as the shapes of fish, rifles, baseball bats, etc., and in general any shape that accommodates axle 110, reversible retraction mechanism 128 and coiled flexible screen 130.

In use, when a user receives an incoming transmission to telecommunication device 101, and wishes to view a video component of the transmission by means of flexible screen 130, the user grasps end unit 138, and pulls end unit away from casing 114 of retractor 102 until flexible screen 130 is uncoiled from axle 110 of retractor 102 and extends to a desired extent. The user then views the video component of the transmission on the extended flexible screen 130. When the user has finished viewing the transmission and desired to end use of telecommunication device 101, he or she then activates retractor 102 (e.g., by releasing a conventional retractor locking mechanism, activating a motor or other powered drive, etc.). Flexible screen 130 is then withdrawn into casing 114 and re-coiled about axle 110 of retractor 102. Retraction ends (automatically, by user deactivation of a powered drive, etc.) when end unit 138 contacts lateral surface 120 of casing 114 of retractor 102. Retracted flexible screen 130 is now ready for its next use.

Figure 14A:
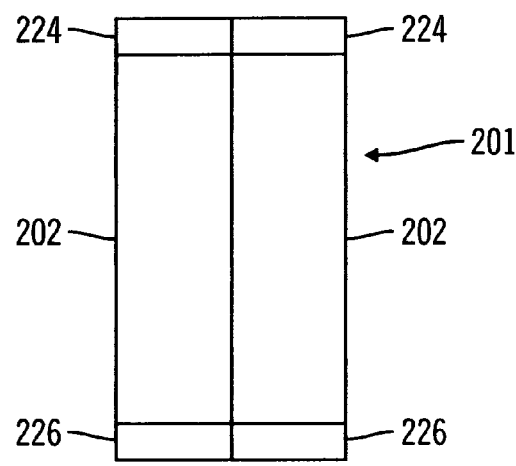
FIGS. 14a-b are side retracted and side extended views of an embodiment of a "scroll phone"
Figure 14B:
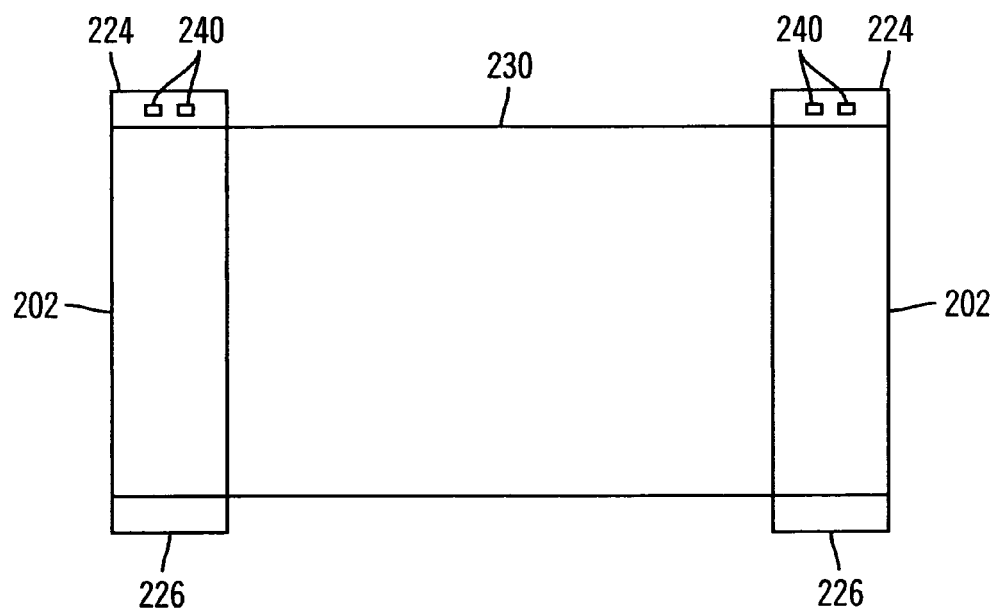

In FIGS. 14a-b, a "scroll" embodiment of a telecommunication device 201 includes paired retractors 202. In "scroll" embodiments, end unit 138 is replaced by a second retractor, to which the end of flexible screen 230 which in the foregoing embodiment is secured to end unit 138 is instead secured. Both ends of flexible screen 230 now coil within their respective retractors 202. One or more of top and bottom caps 224, 226 of retractors 202 contain various smart phone components 240, which communicate with flexible screen 230 in a manner similar to the foregoing embodiment.

In use, a user grasps a retractor 202 in either hand, and spreads them apart in order to extend flexible screen 230 from its coiled state within retractors 202. Once the user has extended flexible screen 230 to the desired extend, he or she can, in various embodiments, secure retractors 202 against further extension, or retraction, of flexible screen 230. When the user has finished viewing a transmission, he or she releases retractors 202, allowing them to retract either end of flexible screen back into a coiled state within retractors 202. When flexible screen 230 has been fully retracted, retractors 202 are positioned adjacent each other, creating the appearance of a wound scroll, such as a Torah scroll.

Various embodiments of the foregoing "scroll" telecommunication device can include clasps, magnets, or other connecting devices, which facilitate wearing the unwound device in a manner similar to the wrist phones described herein, e.g., the embodiment of FIGS. 1 and 12.

Wrist and scroll devices as described herein can be further modified by including, for example, additional supporting members such as telescoping supports that deploy outward from a device's casing. Such members can be straight or curved, rigid or flexible. Certain embodiments thus afford production of a "wide screen" or "Cinerama" effect, in which an extended flexible screen "wraps around" some or all of a user's field of vision. Still other modifications include providing earpieces to end caps 45 or similar structures, as well as a curved supporting structure configured to engage a human nose. Such embodiments can thus be worn, in the manner of sunglasses or the like, in order to "surround" a user with a video display provided to the smart phone.

Embodiments of the Wrist Phone as described herein can be used with function controllers such as finger computer display and controller devices disclosed in U.S. Provisional Patent Application 61/849,982 (filed Feb. 5, 2013), the disclosure of which is incorporated by reference herein in full as though set forth in herein in full.

What is claimed is:
1. A telecommunication device comprising:
a) a casing having upper, lower and opposing surfaces,
b) smart phone components disposed within the casing,
c) two opposed flexible wrist grips one secured to and extending from each opposing end surface of the case, the opposed flexible wrist grips having upper and lower surfaces, and
d) a flexible screen disposed on the lower surfaces of the casing and the opposed flexible wrist grips, whereby the flexible screen faces away from the lower surface and is in communication with the smart phone components,
e) a second screen in communication with the smart phone components, wherein the casing has an upper surface and the second screen is disposed on or in the upper surface of the casing, wherein the second screen is a fixed screen.

2. The telecommunication device of claim 1 where the opposed flexible wrist grips have opposing side edges and the flexible screen is secured to the casing but not the opposing flexible wrist grip and where the telecommunication device further comprises two opposed elongated flexible grooved guides extending along the lower surface of each opposed flexible wrist grip along the opposing side edges of the wrist grip, where the two opposed elongated flexible grooved guides moveably engage the flexible screen within the grooved guides along the edges of the flexible screen so that the flexible screen is still visible when engaged by the grooved guides.

3. The telecommunication device of claim 1 where the two opposed flexible wrist grips comprise a plurality of segments.

4. The telecommunication device of claim 1 further comprising a protective layer applied to at least a portion of the top surface of the flexible screen.

5. The telecommunication device of claim 1 further comprising a second screen in communication with the smart phone components, wherein the casing has an upper surface and the second screen is disposed on or in the upper surface of the casing.

6. The telecommunication device of claim 1 wherein the two opposed flexible wrist grips have distal ends, and wherein a clasp secures the two distal ends.

7. A telecommunication device comprising:
a) a retractor comprising
  i) an axle,
  ii) at least one conductor in communication with the axle,
  iii) a cylindrical casing having a top, a bottom and a lateral surface, the lateral surface having defined therein a slot, the slot extending substantially in parallel to the axle,
  iv) top and bottom caps secured to the cylindrical casing, and
  v) a reversible retraction mechanism,
b) a flexible screen having proximal and distal ends, the flexible screen being coilable about the axle, the proximal end being secured to the axle, the distal end extending through the slot in the cylindrical casing, the flexible screen communicating with at least one conductor of the retractor,
c) an end unit secured to the distal end of the flexible screen, the end unit configured to prevent retraction of the distal end of the flexible screen into the cylindrical casing, and
d) smart phone components disposed within at least one of the top and bottom caps of the casing, the smart phone components being in communication with the flexible screen through at least one conductor of the retractor;

e) a flexible wrist grip secured to the retractor to allow the retractor to be worn around the wrist of the user, and f) a second screen in communication with the smart phone components, wherein the second screen is a fixed screen.

8. A telecommunication device comprising:

a) a casing having a pair of opposed sides, b) smart phone components disposed within the casing, c) a flexible screen having
  i) an interior portion secured to the casing and in communication with the smart phone components, and
  ii) opposed extensible distal ends, each extensible distal end extending away from one of the opposed sides of the casing, and d) retractors secured to each of the opposed extensible distal ends of the flexible screen, each retractor being configured to retract an extensible distal end of the flexible screen until the retractor contacts a side of the casing away from which the extensible distal end of the flexible screen to which the retractor is secured extends, each retractor being further configured to enable extension of the extensible distal end of the flexible screen to which the retractor is secured; and e) a connecting device secured to the casing for maintaining the telecommunication on person or on clothing or accessories worn on a person, and f) a second screen in communication with the smart phone components, wherein the casing has an upper surface and the second screen is disposed on or in the upper surface of the casing, wherein the second screen is a fixed screen.

* * * * *